(12) United States Patent
Yan

(10) Patent No.: US 6,601,028 B1
(45) Date of Patent: Jul. 29, 2003

(54) SELECTIVE MERGING OF SEGMENTS SEPARATED IN RESPONSE TO A BREAK IN AN UTTERANCE

(75) Inventor: Yonghong Yan, Beijing (CN)

(73) Assignee: Intel Corporation, Santa Clara, CA (US)

( * ) Notice: Subject to any disclaimer, the term of this patent is extended or adjusted under 35 U.S.C. 154(b) by 474 days.

(21) Appl. No.: 09/648,591

(22) Filed: Aug. 25, 2000

(51) Int. Cl.$^7$ .............................................. G10L 15/04
(52) U.S. Cl. ...................................................... 704/254
(58) Field of Search ................................ 704/246, 254, 704/255, 256, 257

(56) References Cited

U.S. PATENT DOCUMENTS

| | | | | |
|---|---|---|---|---|
| 5,805,772 A | * | 9/1998 | Chou et al. | 704/255 |
| 5,806,030 A | * | 9/1998 | Junqua | 704/245 |
| 5,884,259 A | * | 3/1999 | Bahl et al. | 704/252 |
| 5,983,180 A | * | 11/1999 | Robinson | 704/254 |
| 6,067,514 A | * | 5/2000 | Chen | 704/235 |
| 6,067,520 A | * | 5/2000 | Lee | 704/270 |
| 6,275,802 B1 | * | 8/2001 | Aelten | 704/255 |
| 6,292,778 B1 | * | 9/2001 | Sukkar | 704/256 |

* cited by examiner

*Primary Examiner*—Susan McFadden
(74) *Attorney, Agent, or Firm*—Alan K. Aldous; Steven P. Skabrat

(57) ABSTRACT

In some embodiments, the invention involves a method including segmenting an utterance into at least a first segment and a second segment, wherein a boundary between the first and second segments corresponds to a break in the utterance. The method further includes selecting potential hypothetical paths of potential words in the first and second segments that cross the boundary. The method also includes applying a language model to the potential hypothetical paths crossing to determine whether to merge the first and second segments and to apply decoding to the merged segments.

25 Claims, 3 Drawing Sheets

SELECTIVE MERGING OF SEGMENTS SEPARATED IN RESPONSE TO A BREAK IN AN UTTERANCE

BACKGROUND OF THE INVENTION

1. Technical Field of the Invention

The present invention relates to speech recognition and, more particularly, to selectively merging of segments separated in response to a break in an utterance.

2. Background Art

One component in a speech recognizer is the language model. A popular way to capture the syntactic structure of a given language is using conditional probability to capture the sequential information embedded in the word strings in sentences. For example, if the current word is W1, a language model can be constructed indicating the probabilities that certain other words W2, W3, ... Wn, will follow W1. The probabilities of the words can be expressed such that P21 is the probability that word W2 will follow word W1, where P21=(W2|W1). In this notation, P31 is the probability word W3 will follow word W1; P41 is the probability word W4 will follow word W1, and so forth with Pn1 being the probability that Wn will follow word W1. The maximum of P21, P31, ... Pn1 can be identified and used in the language model. The preceding examples are for bi-gram probabilities. Computation of tri-gram conditional probabilities is also well known.

Language models are often created through looking at written literature (such as newspapers) and determining the conditional probabilities of the vocabulary words with respect to others of the vocabulary words.

In speech recognition systems, complex recognition tasks, for example, such as long utterances, are typically handled in stages. Usually these stages include a segmentation stage which involves separating a long utterance into shorter segments. A first-pass within-word decoding is used to generate hypotheses for segments. A final-pass cross-word decoding generates the final recognition results with detailed acoustic and language models.

In the segmentation stage, long segments are typically chopped first at the sentence boundary and then at the word boundary (detected by a fast word recognizer). A typical way to detect sentence beginning and endings are between boundaries of silence (pause in speaking) detected by, for example, a mono-phone decoder. The assumption is that people momentarily stop speaking at the end of a sentence. The resulting segments are short enough (about 4 to 8 seconds) to ensure that they can be handled by the decoder given constrains of real-time pipeline and memory size. In the traditional decoding procedure, each short segment, which can be any part of a sentence, is decoded, and each transcription is merged to give the complete recognition result.

Another way in which segment (e.g., sentence) boundaries can be created is in response to unrecognizable non-speech noise, such as background noise.

The problem noticed by the inventor of the invention in this disclosure is that with the existing systems, the language model is not applied across segment boundaries. Accordingly, if a sentence is ended because of an unintended break (e.g., pause or noise), the language model will not be applied between the last word of the ending sentence and the first word of the beginning sentence. In the case in which the last word of the ending sentence and the first word of the beginning sentence are intended to be part of a continuous word stream, the benefits the language model could provide are not enjoyed with present recognition systems.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

The present invention provides a solution to the problem outlined above. The invention selectively merges segments that are separated through a pause or noise. The usual decoding is performed on short segments in preliminary passes. The preliminary passes may be made using known within-word context-dependent models and other well known techniques. Then, the decoding segments are selective connect so segments from the same long utterance are merged back. The final decoding pass proceeds with the resulting complete sentences instead of more than one short segments. This merge stage may be dynamically constructed in a memory image.

Figure 1:
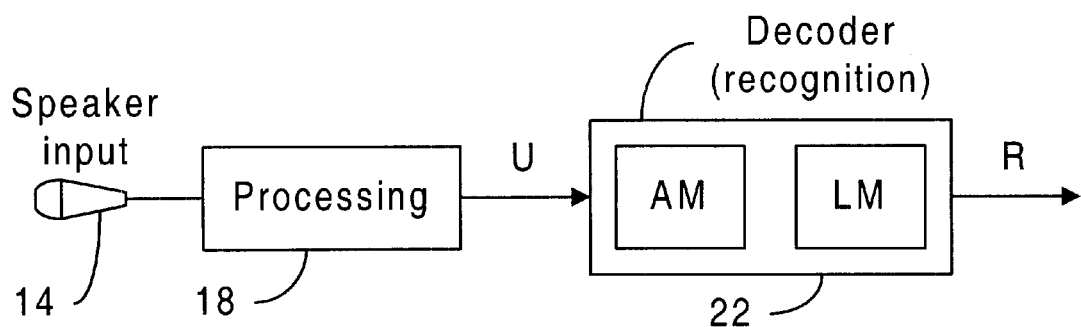
FIG. 1 is a schematic block diagram representation of a speech recognition system according to some embodiments of the present invention.

Referring to FIG. 1, a speaker input such as microphone 14 receives utterances which are converted to processed digital utterance signals U and may be otherwise processed according to known techniques by processing block 18. Note that microphone 14 may be adjacent to the computer system that performs the acts illustrated in FIG. 1 or microphone may be remote from it. For example, microphone 14 may be in a telephone or remote other system. Processing block 18 provides the processed utterances U to a decoder (recognition) block 22 which provides recognized words R. Decoder 22 includes acoustic model (AM) processes and language model (LM) processes, which may be according to known techniques.

The language model is trained on a sentence basis. During decoding, the decoder assumes that each segment is a sentence: which may begin with a sentence-begin token and end with a sentence-end token. When incorrectly created, these sentence boundaries cause training and decoding mismatch, which has impact on system performance. The invention does not require inserting any extra tokens into the word list or require a re-training of the language model. The mismatch of how a language model is estimated verses how it is used is naturally compensated by merging short segments into a long utterance (sentence).

For short segments with only few words, it is difficult to apply high-order language models (for example, a trigram can be only used once for a sentence with only three words). Therefore, high-order language models can be applied to the transition of incorrectly separated segments. In the later case, the power of high-order language models is limited. With the invention, short segments are merged into a long utterance before the final decoding pass. Thus, the limited usage of powerful language model (high order language model) caused by segmentation is alleviated.

Figure 2:
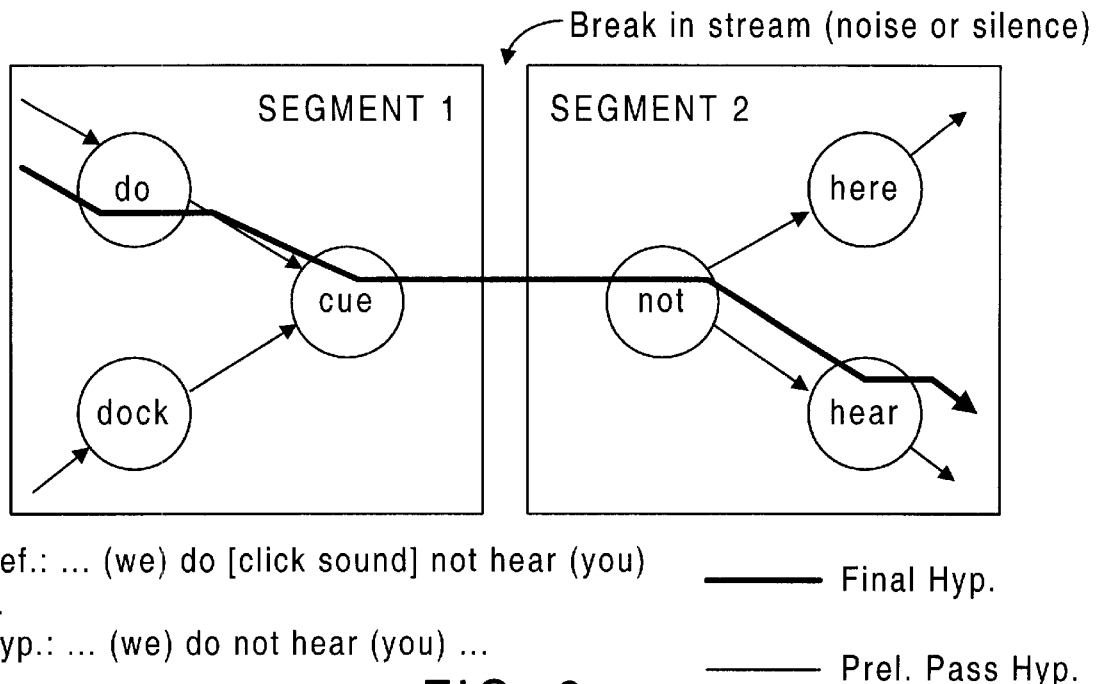
FIG. 2 illustrates a prior art approach to segmentation which two normal decoding segments are each decoded individually and the final transcription is a concatenation of each segment.

FIG. 2 illustrates the prior art technique in which segments 1 and 2 are incorrectly separated because of a break in the utterance stream cause by a silence (pause in speaking) or noise (either unrecognizable speech or non-speech noise). In FIG. 2, each segment is decoded individually and the final transcription is a concatenation of each segment.

In FIG. 2, only part of the segments are shown. That is, segment 1 includes words (not shown) before "do" and "dock" and the language model provides many options in addition to "do" and "dock." Likewise, segment 2 would contain additional word options in the language model and words following "here" and "hear." In the example, the "cue" represents a clicking noise, but could be a pause. Assume the reference word stream is "(we) do [click sound] not hear (you)."

Figure 3:
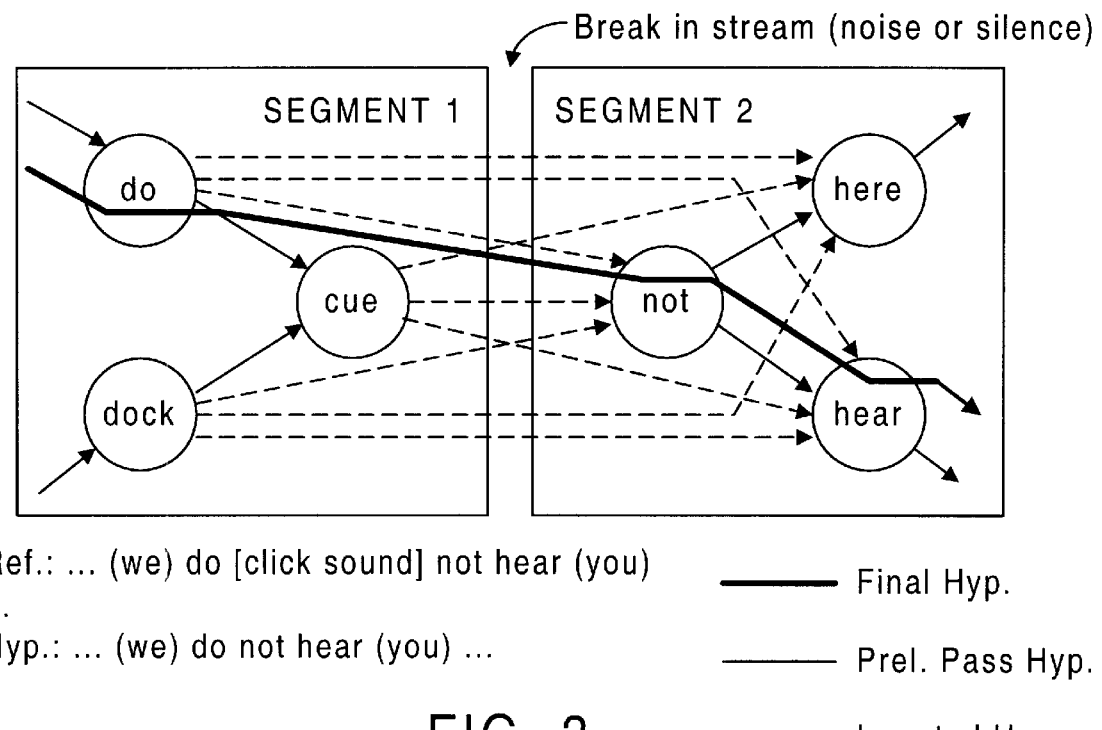
FIG. 3 illustrates an approach according to some embodiments of the current invention in which two segments are merged before an additional decoding pass.

FIG. 3 illustrates some embodiments of the invention. Segments 1 and 2 are merged before an additional decoding pass. The additional decoding pass may be a final decoding pass or a non-final decoding pass. The reason to make a full connection beyond the segment boundary words is to add extra flexibility to deal with noisy data (boundary noise) or pauses.

In FIG. 3, a thick solid line represents a final hypothetical word order selection. The thin solid line represents preliminary hypothetical word order selection possibilities. The dashed lines represent inserted hypothetical possibilities to connect segments 1 and 2. In some embodiments, all possible paths are considered. The possible path with the highest conditional probability can be selected. If there is a tie, various approaches can be taken including a round robin approach or always take the first, to name only two of various possible approaches.

In some embodiments, the segments are joined and re-decoded if the language model indicates a probability having a particular relationship to a merging threshold. For example, that relationship could be the probability is greater than the merging threshold. Alternatively, the relationship could be that the probability is greater than or equal to the merging threshold. If the language model indicates that more than one combination of words across the segment boundary is above the merging threshold, then the combination with the highest probability may be chosen. As is well known, pruning can occur if the probabilities are below a threshold. Accordingly, there may be at least two thresholds involved (1) a pruning threshold and (2) the merging threshold.

The probability that the segments is connected may depend on the reason for the break. For example, if the break is caused by background noise that is not coincident with speech, it may be quite likely that the segments are connected. If the break is caused by unrecognizable speech, it might be less likely that the segments will be connected. If the break is caused by a pause in speech, the likelihood may depend on the length of the pause. The length of the pause might be taken into consideration in deciding whether to join the segments. In some embodiments, the merging threshold is lower if the break is the result of a pause. In other embodiments, the probabilities are increased. Under still other embodiments, the cause of the break is not considered.

The merging of segments may be referred to as reconstruction of search paths because segments which were separated are merged. It is referred to as dynamic reconstruction because it occurs in almost real time depending on whether the indication of the language model. This merge stage may be dynamically constructed in a memory image.

Suppose during the segmentation stage, we already recorded information of short segments and their belonging complete utterances. The following pseudo-code merges two short segments according to some embodiments of the invention:

```
foreach word1 in (Seg1) {
    if (StartWord(word1)) {
        for each word2 in (Seg2)
            if (EndWord(word2)) {
                /*Insert an edge from word1 to word2 */
                InsertEdge(word 1 ,word2);
            }
    }
}
bool StartWord(word)
    for each word1 in (set of incoming words to word) {
        if (word1 == SENTENCE_BEGIN) {
            return true;
        } else {
            for each word2 in (set of incoming words to word1) {
                if (word2 == SENTENCE_BEGIN) {
                    return true;
                }
            }
        }
    }
    return false;
}
bool EndWord(word) {
    for each word1 in (set of outgoing words from word) {
        if (word1 == SENTENCE_END) {
            return true;
        } else {
            for each word2 in (set of outgoing words from word1) {
                if (word2 == SENTENCE_END) {
                    return true;
                }
            }
        }
    }
}
```

Figure 4:
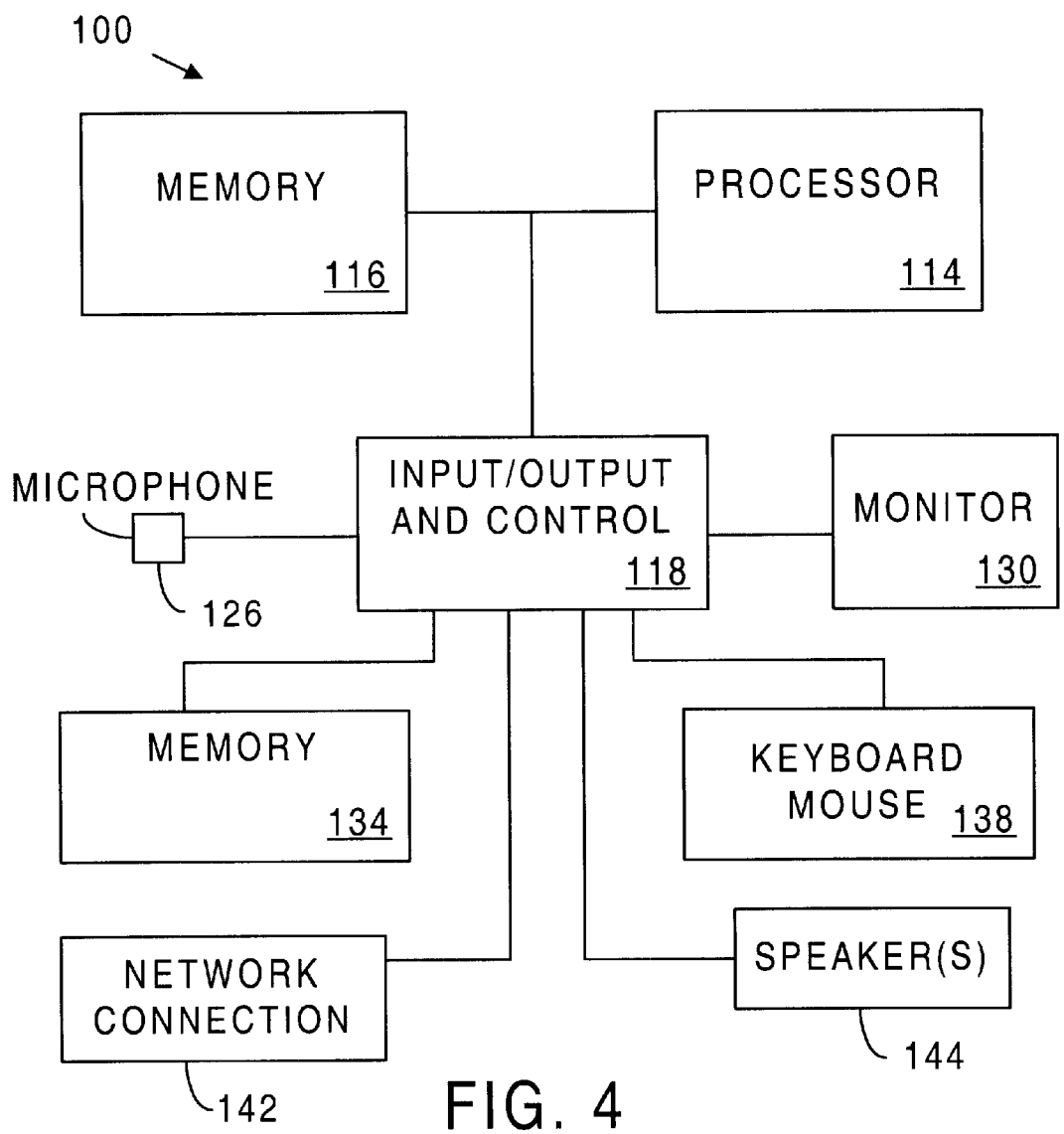
FIG. 4 is a high level schematic block diagram representation of a computer system that may be used in connection with some embodiments of the invention.

There are a variety of computer systems that may be used in training and for speech recognition system. Merely as an example, FIG. 4 illustrates a highly schematic representation of a computer system 100 which includes a processor 114, memory 116, and input/output and control block 118. There may be a substantially amount of memory in processor 114 and memory 116 may represent both memory that is off the chip of processor 114 or memory that is partially on and partially off the chip of processor 114. (Or memory 116 could be completely on the chip of processor 114). At least some of the input/output and control block 118 could be on the same chip as processor 114, or be on a separate chip. A microphone 126, monitor 130, additional memory 134, and input devices (such as a keyboard and mouse 138), a network connection 142, and speaker(s) 144 may interface with input/output and control block 118. Memory 134 represents a variety of memory such as a hard drive and CD ROM or DVD discs. These memories are examples of articles including computer readable storage media that can hold instructions to be executed causing some embodiments of the invention to occur. It is emphasized that FIG. 4 is merely exemplary and the invention is not limited to use with such a computer system. Computer system 110 and other computer systems used to carry out the invention may be in a variety of forms, such as desktop, mainframe, and portable computers.

Figure 5:
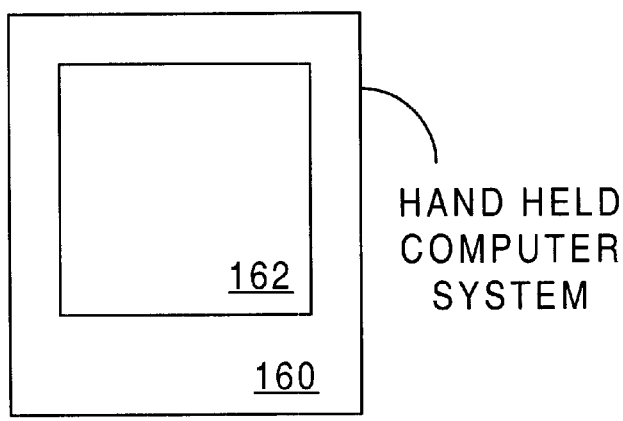
FIG. 5 is a high level schematic representation of a hand-held computer system that may be used in connection with some embodiments of the invention.

For example, FIG. 4 illustrates a handheld device 160, with a display 162, which may incorporate some or all the features of FIG. 4. The hand held device may at times interface with another computer system, such as that of FIG. 4. The shapes and relative sizes of the objects in FIGS. 4 and 5 are not intended to suggest actual shapes and relative sizes.

The present invention may be implemented accordingly to various well known techniques or through techniques currently not known.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. A method comprising:
    segmenting an utterance into at least a first segment and a second segment, wherein a boundary between the first and second segments corresponds to a break in the utterance;
    selecting potential hypothetical paths of potential words in the first and second segments that cross the boundary; and
    applying a language model to the potential hypothetical paths crossing to determine whether to merge the first and second segments and to apply decoding to the merged segments.

2. The method of claim 1, wherein the determination of whether to merge the first and second segments includes determining whether the language model indicates any of the potential hypothetical paths exceeds a merging threshold.

3. The method of claim 1, wherein the determination of whether to merge the first and second segments includes determining whether the language model indicates any of the hypothetical paths equals or exceeds a merging threshold.

4. The method of claim 1, wherein the potential hypothetical path associated with the highest probability as indicated by the language model is selected as the hypothetical path as long as the probability at least exceeds a merging threshold.

5. The method of claim 1, wherein a pruning threshold is considered in applying the language model.

6. The method of claim 1, wherein the merging is dynamically constructed in a memory image.

7. The method of claim 1, wherein the break in the utterance is a pause in speaking for at least a particular amount of time.

8. The method of claim 1, wherein the break in the utterance is an unrecognizable noise.

9. The method of claim 1, wherein the break in the utterance is an unrecognizable speech.

10. A method comprising:
    segmenting an utterance into at least a first segment and a second segment, wherein a boundary between the first and second segments corresponds to a break in the utterance;
    performing decoding on the first segment;
    performing decoding on the second segment;
    selecting potential hypothetical paths of potential words in the first and second segments that cross the boundary; and
    applying a language model to the potential hypothetical paths crossing to determine whether to merge the first and second segments and to apply an additional decoding to the merged segments.

11. The method of claim 10, wherein the potential hypothetical path associated with the highest probability as indicated by the language model is selected as the hypothetical path as long as the probability at least exceeds a merging threshold.

12. The method of claim 10, wherein the merging is dynamically constructed in a memory image.

13. The method of claim 10, wherein the determination of whether to merge the first and second segments includes determining whether the language model indicates any of the hypothetical paths at least equals a merging threshold.

14. An article comprising:
    a storage medium to hold instructions which when executed cause a computer to performing the following method:
    segmenting an utterance into at least a first segment and a second segment, wherein a boundary between the first and second segments corresponds to a break in the utterance;
    selecting potential hypothetical paths of potential words in the first and second segments that cross the boundary; and
    applying a language model to the potential hypothetical paths crossing to determine whether to merge the first and second segments and to apply decoding to the merged segments.

15. The article of claim 14, wherein the determination of whether to merge the first and second segments includes determining whether the language model indicates any of the potential hypothetical paths exceeds a merging threshold.

16. The article of claim 14, wherein the determination of whether to merge the first and second segments includes determining whether the language model indicates any of the hypothetical paths equals or exceeds a merging threshold.

17. The article of claim 14, wherein the potential hypothetical path associated with the highest probability as indicated by the language model is selected as the hypothetical path as long as the probability at least exceeds a merging threshold.

18. The article of claim 14, wherein a pruning threshold is considered in applying the language model.

19. The article of claim 14, wherein the merging is dynamically constructed in a memory image.

20. The article of claim 14, wherein the break in the utterance is a pause in speaking for at least a particular amount of time.

21. The article of claim 14, wherein the break in the utterance is an unrecognizable noise.

22. The article of claim 14, wherein the break in the utterance is an unrecognizable speech.

23. An article comprising:

a storage medium to hold instructions which when executed cause a computer to performing the following method:

segmenting an utterance into at least a first segment and a second segment, wherein a boundary between the first and second segments corresponds to a break in the utterance;

performing decoding on the first segment;

performing decoding on the second segment;

selecting potential hypothetical paths of potential words in the first and second segments that cross the boundary; and applying a language model to the potential hypothetical paths crossing to determine whether to merge the first and second segments and to apply an additional decoding to the merged segments.

24. The article of claim 23, wherein the potential hypothetical path associated with the highest probability as indicated by the language model is selected as the hypothetical path as long as the probability at least exceeds a merging threshold.

25. The article of claim 23, wherein the merging is dynamically constructed in a memory image.

* * * * *